Figure 1:
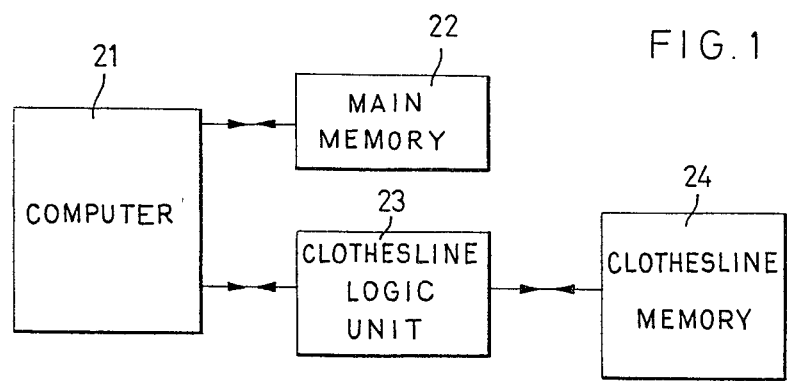

United States Patent [19]

Rodgers et al.

[11] 4,125,879
[45] Nov. 14, 1978

[54] DOUBLE ENDED STACK COMPUTER STORE

[75] Inventors: John L. Rodgers, Hanworth; David Schofield, Hampton Hill, both of England

[73] Assignee: National Research Development Corporation, London, England

[21] Appl. No.: 767,221

[22] Filed: Feb. 9, 1977

[30] Foreign Application Priority Data

Feb. 11, 1976 [GB] United Kingdom ................ 5286/76

[51] Int. Cl.$^2$ ............................................. G11C 8/00
[52] U.S. Cl. ................................................ 365/236
[58] Field of Search ............ 340/173 RC; 307/221 R, 307/222 R, 222 C, 223 R, 223 C; 365/73, 74, 75, 81, 78, 221, 236, 239, 240; 364/200 MS File, 900 MS File; 328/44, 37, 43

[56] References Cited

U.S. PATENT DOCUMENTS

| 3,553,651 | 1/1971 | Bird et al. | 364/900 |
| 3,686,641 | 8/1972 | Logan et al. | 364/200 |
| 3,771,142 | 11/1973 | Minshull et al. | 364/200 |
| 3,797,002 | 3/1974 | Brown | 340/173 R |
| 3,878,513 | 4/1975 | Werner | 364/200 |
| 3,889,243 | 6/1975 | Drimak | 364/200 |

Primary Examiner—Bernard Konick
Assistant Examiner—Donald McElheny
Attorney, Agent, or Firm—Cushman, Darby & Cushman

[57] ABSTRACT

The invention provides a computer store having successively addressed storage locations for individual words grouped together to form so-called clotheslines. Data can be written into and read out from either end of a clothesline. A clothesline thus combines the properties of a stack and a silo and can be considered as either a double-ended stack or as a reversible silo.

4 Claims, 8 Drawing Figures

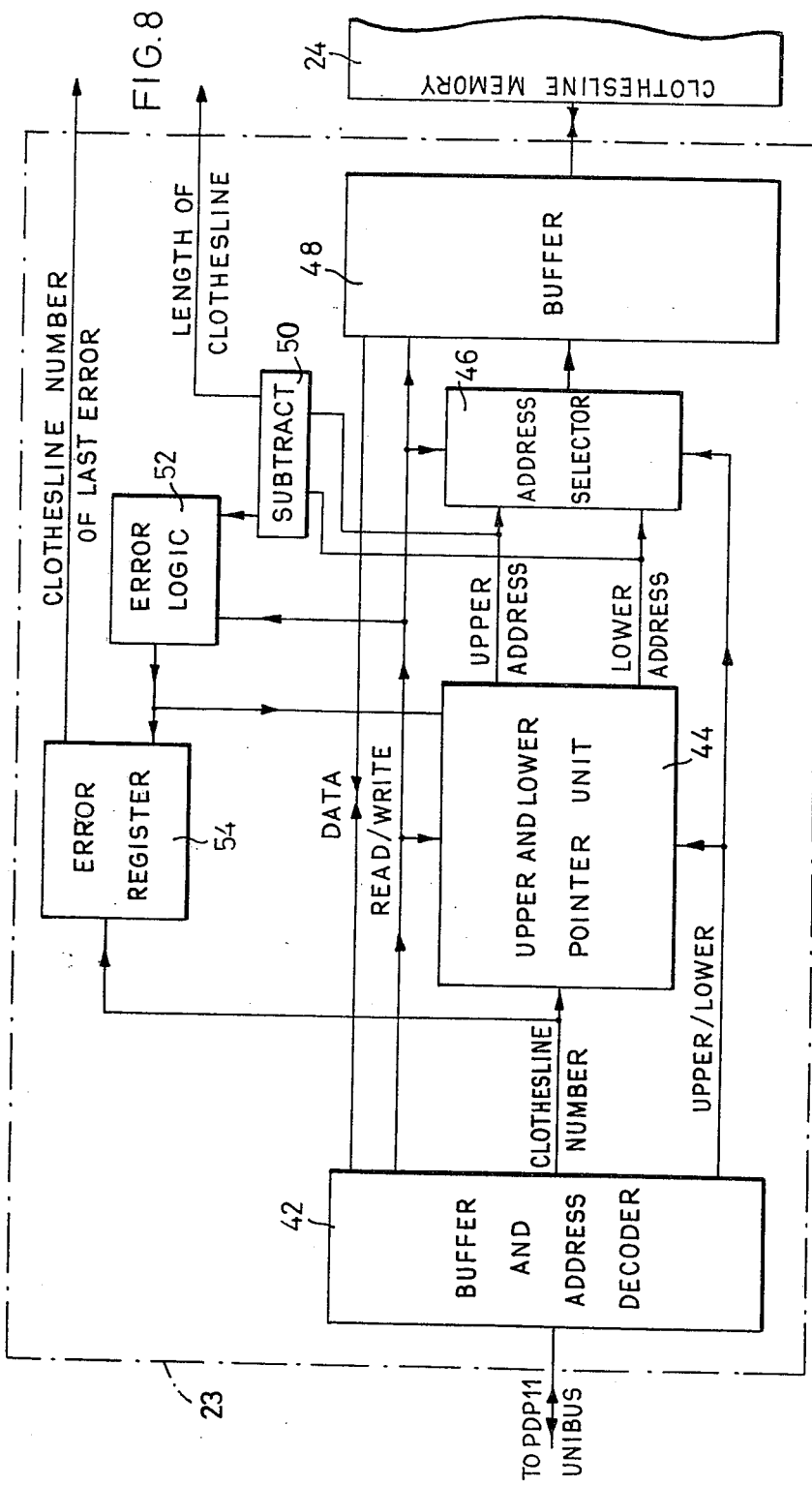

DOUBLE ENDED STACK COMPUTER STORE

This invention relates to computer stores and is particularly concerned with the provision of a computer store which enables more fast access memory to be attached to a conventional computer than is possible using normal addressing technique.

In a conventional computer, the store is addressed usually using one computer word as the addressing variable. This means that for a computer having a word length of $n$ binary bits, at most $2^n$ words of random access store can be referenced by one computer instruction. In practice, this limits the maximum size of program than can be run on a computer without splitting the program into smaller component parts.

According to the invention, there is provided a computer store comprising a series of sequentially numbered storage locations, upper limit means for storing a first number indicating a storage location, means for incrementing the count in said upper limit means when data is written into the storage location indicated by said first number and decrementing the count in said upper limit means when data is read out from the storage location indicated by said first number, lower limit means for storing a second number indicating a storage location and means for decrementing the count in said lower limit means when data is written into the storage location indicated by said second number and incrementing the count in said lower limit means when data is read out from the storage location indicated by said second number, the means for incrementing and decrementing said limit means being arranged to set said limit means to the lowest numbered of said sequentially numbered storage locations when incrementing from the highest numbered of said sequentially numbered storage locations and to set said limit means to the highest numbered of said sequentially numbered storage locations when decrementing from the lowest numbered of said sequentially numbered storage locations.

In use, the storage locations containing data are those between the locations indicated by the upper and lower limit means. Data can be written into and read from both the upper and lower ends of the part of the store containing data. A computer store in accordance with the invention thus combines the properties of a stack computer store operating on a first-in-last-out basis, and a silo computer store operating on a first-in-first-out basis and can therefore be considered as either a double-ended stack or as a reversible silo. Such a store will hereinafter be referred to as a clothesline and a unit containing a plurality of clotheslines will be referred to as a clothesline memory.

Preferably the arrangement is such that the numbers stored in the limit means are altered before each reading operation and after each writing operation so that the limit means indicate the highest and lowest numbered locations containing data.

The upper and lower limit means may each comprise a respective counter. However, when a number of clotheslines are provided, it is preferable to use a fast access memory, i.e. a memory in which access to any storage location can be obtained rapidly, to record the two limits for each clothesline and to use a common counter to perform the required incrementing and decrementing operations.

An embodiment of the invention will now be described, by way of example, with reference to the accompanying drawings, in which:

FIG. 1 is a block diagram illustrating the connection of a clothesline memory in accordance with the invention to a computer.

Figure 2:
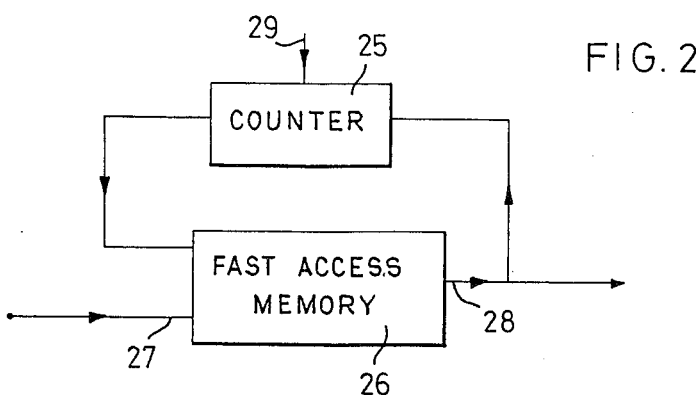
Figure 5:
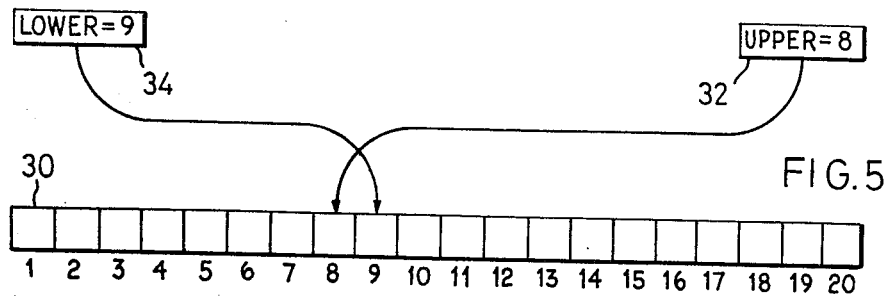
Figure 6:
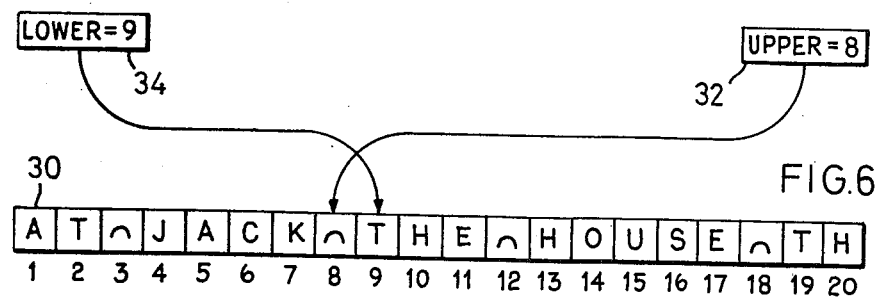
Figure 7:
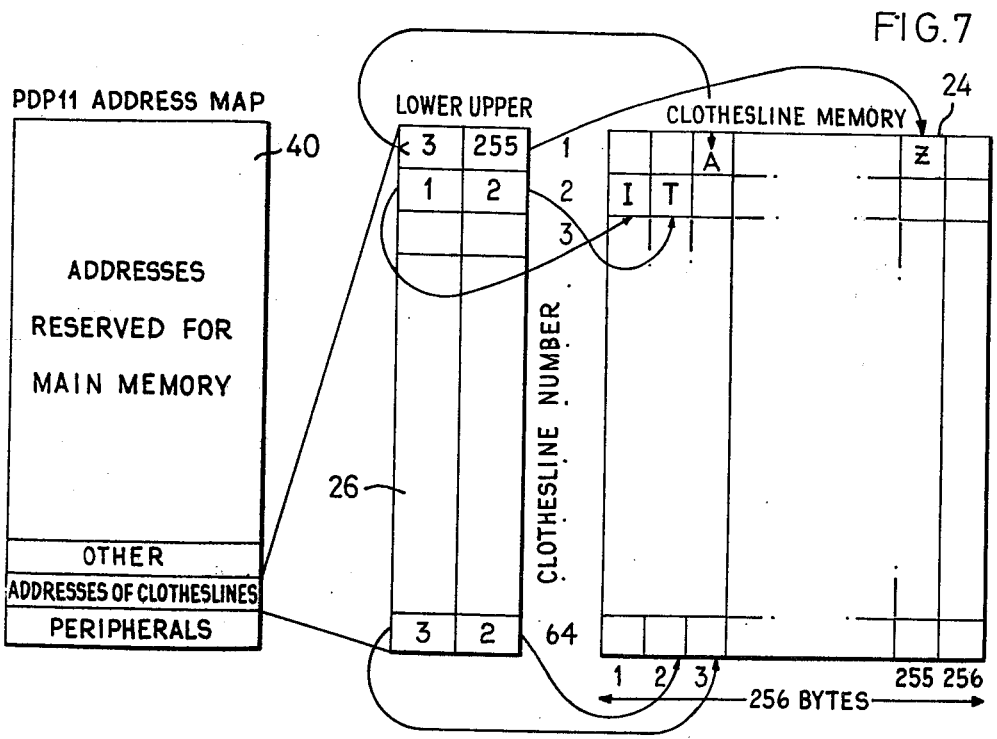

FIG. 2 is a schematic diagram illustrating part of one of the components of the system shown in FIG. 1, FIGS. 3 to 6 are schematic diagrams illustrating a clothesline of size twenty containing different amounts of data, FIG. 7 is a schematic diagram illustrating the arrangement of 64 clotheslines in a 16k by 8-bit memory and, FIG. 8 is a block diagram of the logic unit connecting the clothesline memory to the computer as shown in FIG. 1.

Referring to FIG. 1, a computer 21 having a main memory 22 is connected by a clothesline logic unit 23 to a clothesline memory 24 comprising a plurality of clotheslines in accordance with the invention each of which may comprise blocks of adjacently addressed storage locations in a semi-conductor or core memory. The logic unit 23 comprises means for recording the addresses of the two ends of the data in each clothesline, together with means for incrementing and decrementing such addresses.

A respective unit comprising two counters and an adder may be provided for recording the addresses of the ends of each clothesline but this is impractical if a large number of clotheslines are to be provided. Referring to FIG. 2, a single counter 25 may be provided for all the clotheslines and a fast access memory 26, which may be a random access memory, used to store the addresses of the two ends of the clotheslines. Signals indicating a number identifying the required clothesline and whether the address of the upper or lower end is required are applied to the input 27 and the appropriate address is read out at 28. This address is applied to the input of the counter 25 which is set accordingly. When the address is to be incremented or decremented, an appropriate stepping signal is applied to the control input 29 of the counter 25 and the amended address is read out from the counter 25 and written back into the appropriate location in the fast access memory 26.

Figure 3:
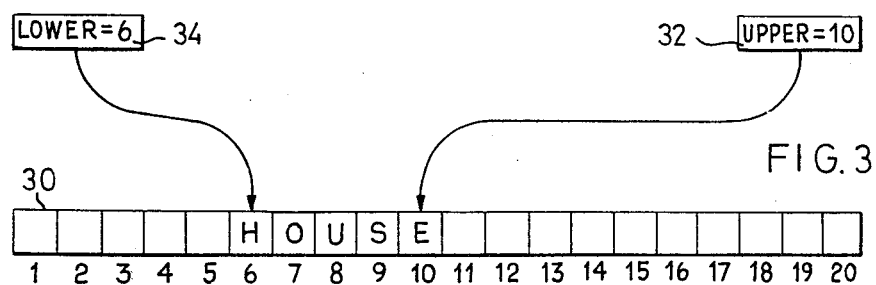

FIG. 3 shows a simple clothesline 30 having twenty memory locations 1 to 20 each of which is of sufficient capacity to contain a binary number of the same length as a computer word. The clothesline logic unit provides an upper pointer 32 and a lower pointer 34 for the clothesline 30. The clothesline 30 contains the word "HOUSE", a respective computer word representing each letter. The lower pointer 34 points to memory address 6 which contains a code for the "H" and the upper pointer 32 points to memory address 10 which contains the letter "E". Only these two letters are available immediately, but access to the others may be obtained by removing letters one after another in a sequential operation.

A problem could arise when the upper pointer reaches 20 but the clothesline is not full. In accordance with a feature of the invention, the clothesline is "wrapped around" so that memory location 1 is considered to be the location next above memory location 20. Thus in FIG. 4, the words "THAT JACK" is held in locations 18 to 20 and 1 to 6, the symbol ⌐ being the space character.

It will be realised from the foregoing that, since the lower and upper pointers point to the lower and upper memory locations containing data, when the clothesline is empty, the upper pointer will point to the adjacent memory location below that pointed to by the lower pointer 34.

For example, the upper pointer 32 may point to the memory location 8 and the lower pointer 34 to the memory location 9 as shown in FIG. 5.

Figure 4:
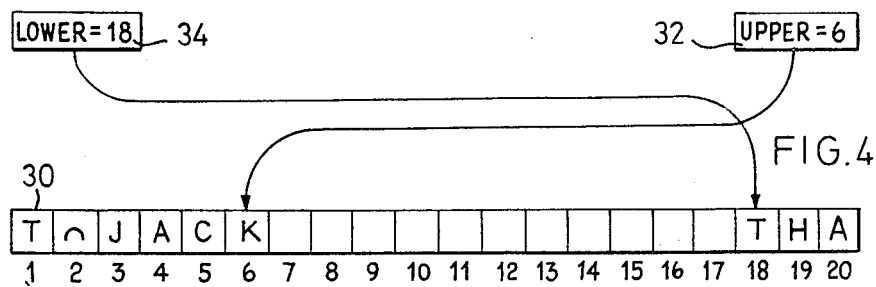

Referring to FIG. 6, it will be realised that the condition of the pointers 32 and 34 when the clothesline 30 is empty is identical with their condition when the clothesline 30 is full. For example, FIG. 4 shows the clothesline 30 containing the words "THE HOUSE THAT JACK". To distinguish between the empty and full conditions, a separate "empty" marker (not shown) in the clothesline logic unit is set if the upper pointer 32 points to the memory locations next below that pointed to by the lower pointer 34 after a read operation, as shown in FIG. 5, but not after a write operation, as shown in FIG. 6.

The operations to be performed when a clothesline is read or written into at either end are listed in the following table:

|  | LOWER END | UPPER END |
|---|---|---|
| READ | 1. Read character<br>2. Increment LOWER pointer | 1. Read character<br>2. Decrement UPPER pointer |
| WRITE | 1. Decrement LOWER pointer<br>2. Write new character | 1. Increment UPPER pointer<br>2. Write new character |

Referring again to FIG. 3, to add the letter "S" to the upper end of clothesline 30 to make the word "HOUSES" the following operations must be performed. The upper pointer 32 is incremented from location 10 to location 11 and then the new character "S" is written into location 11 to complete the operation. Similarly to read the first letter of the word "HOUSE", the contents of the location 6 pointed to by the lower pointer 34 is read out giving the letter "H" and then the lower pointer 34 is incremented by one to complete the read cycle.

A clothesline memory and logic unit can be interfaced to any computer. Interfacing to a PDP11 minicomputer will be described by way of example. FIG. 7 shows both the address map 40 of the PDP11 and the arrangement of 64 clotheslines, each containing a maximum of 256 8-bit bytes of information in a 16k by 8-bit core store forming the clothesline memory 24. The fast access memory 26, which is used to store clothesline pointers, comprises very fast access semi-conductor integrated circuits which form part of the logic unit 23 (FIG. 1).

The PDP11 address map 40 shows which addresses are used by the computer memory 22 (FIG. 1) and which are available for peripherals. Of the addresses available for peripherals, 128 are used to access the ends of the 64 clotheslines.

FIG. 8 shows the clothesline logic unit 23 in more detail. The PDP11 unibus is connected to a buffer and address decoder 42 which supplies the clothesline number to an upper and lower pointer unit 44 as well as read/write and upper/lower signals to both the upper and lower pointer unit 44 and an address selector 46. The upper and lower pointer unit 44 supplies the addresses of the upper and the lower ends of the clothesline indicated by the selected clothesline number to the address selector 46. The address selector 46 selects the upper or lower address as required and supplies it via a buffer unit 48 to the clothesline memory 24. There is also a direct data path between the buffer unit 42 and 48.

The clothesline logic unit 23 also includes a subtract unit 50 which computes the difference between the upper and lower addresses to provide an output signal to a general purpose interface (not shown) indicating the length of the part of the clothesline containing data. The subtract unit 50 produces a separate output signal when the upper address is one less than the lower address, indicating that the clothesline is either completely empty or completely full, as described above with reference to FIGS. 5 and 6. This signal and the read/write signal are applied to an error logic unit 52 which includes an "empty" marker which is set if the above-mentioned signal from the subtract unit 50 occurs following a read operation but not if it follows a write operation. Then, if an attempt is made to write data into the clothesline when it is full or read data therefrom when it is empty, the error logic unit 52 produces an error signal which is supplied to the upper and lower pointer unit 44 to inhibit the actual reading or writing operation, and also to an error register 52 which records the current clothesline number when such an error is detected and provides an output signal to the general purpose interface indicating the clothesline number of the most recent error.

If the method of effecting the read operation is nondestructive, a "backspace" on a previous read operation may be performed by altering the pointer as for a write operation without writing to the memory 24.

Thus the invention provides a block of store of some fixed maximum size which is accessible only at two points, namely the beginning and the end. Consequently it requires only two main store addresses of the computer but can hold many more than two words of information. As long as the information contained in such a block of store is only required sequentially, for example as in word processing, large amounts of fast access memory can be attached very simply to a minicomputer.

It should be understood that the terms "increment" and "decrement" as used herein mean "add one to" and "subtract one from" respectively and do not mean that such operations are necessarily performed by stepping a counter.

We claim:

1. A computer store comprising a series of sequentially numbered storage locations, upper limit means for storing a first number indicating a storage location, means for incrementing said first number when data is written into the storage location indicated by said first number and decrementing said first number when data is read out from the storage location indicated by said first number, lower limit means for storing a second number indicating a storage location and means for decrementing said second number when data is written into the storage location indicated by said second number and incrementing said second number when data is read out from the storage location indicated by said second number, said respective means for incrementing and decrementing said first and second numbers each including means for setting the associated one of said first and second numbers to a value in accordance with the lowest numbered of said sequentially numbered storage locations when incrementing from the highest numbered of said sequentially numbered storage locations and to set said associated one of first and second numbers to a value in accordance with the highest numbered storage locations when decrementing from the lowest numbered of said sequentially numbered storage locations.

2. A computer store according to claim 1, further comprising subtraction means for detecting when the series of storage locations is completely full or completely empty and means responsive to the subtraction means for inhibiting reading when the series of storage locations is completely empty and for inhibiting writing when the series of storage locations is completely full.

3. A computer store according to claim 1, comprising a plurality of series of sequentially numbered storage locations, the upper and lower limit means for each series of storage locations comprising respective locations in a fast access memory and the incrementing and decrementing means comprising a common counter for all of said plurality of series of storage locations.

4. A computer store according to claim 3, wherein the fast access memory is a random access memory.

* * * * *